United States Patent
McMullen et al.

(10) Patent No.: US 6,897,587 B1
(45) Date of Patent: May 24, 2005

(54) ENERGY STORAGE FLYWHEEL WITH MINIMUM POWER MAGNETIC BEARINGS AND MOTOR/GENERATOR

(75) Inventors: Patrick T. McMullen, Long Beach, CA (US); Co Si Huynh, Alhambra, CA (US)

(73) Assignee: Calnetix, Cerritos, CA (US)

( * ) Notice: Subject to any disclaimer, the term of this patent is extended or adjusted under 35 U.S.C. 154(b) by 0 days.

(21) Appl. No.: 10/347,076

(22) Filed: Jan. 21, 2003

(51) Int. Cl.[7] .............................................. H02K 7/02
(52) U.S. Cl. ................................................. 310/90.5
(58) Field of Search ............................. 310/90.5, 181, 310/74

(56) References Cited

U.S. PATENT DOCUMENTS

| | | | | |
|---|---|---|---|---|
| 4,652,780 A | * | 3/1987 | Murakami et al. ......... 310/90.5 |
| 5,315,197 A | * | 5/1994 | Meeks et al. ............... 310/90.5 |
| 5,514,924 A | * | 5/1996 | McMullen et al. ......... 310/90.5 |
| 5,920,138 A | * | 7/1999 | Clifton et al. .............. 310/90.5 |
| 5,925,952 A | * | 7/1999 | Bichler et al. ................. 310/74 |
| 6,566,775 B1 | * | 5/2003 | Fradella ...................... 310/90.5 |
| 6,570,286 B1 | * | 5/2003 | Gabrys ....................... 310/90.5 |
| 6,664,680 B1 | * | 12/2003 | Gabrys .......................... 310/74 |
| 6,703,735 B1 | * | 3/2004 | Gabrys ....................... 310/90.5 |
| 6,727,617 B2 | * | 4/2004 | McMullen et al. ......... 310/90.5 |

* cited by examiner

Primary Examiner—Dang Le
(74) Attorney, Agent, or Firm—Irving Keschner

(57) ABSTRACT

An optimized flywheel energy storage system utilizing magnetic bearings, a high speed permanent magnet motor/generator, and a flywheel member. The flywheel system is constructed using a high strength steel wheel for kinetic energy storage, high efficiency magnetic bearings configured with dual thrust acting permanent magnet combination bearings, and a high efficiency permanent magnet motor generator. The steel wheel provides a cost effective, high speed construction for the energy storage rotor.

15 Claims, 6 Drawing Sheets

ENERGY STORAGE FLYWHEEL WITH MINIMUM POWER MAGNETIC BEARINGS AND MOTOR/GENERATOR

BACKGROUND OF THE INVENTION

1. Field of the Invention

The present invention relates to the field of the energy storage devices, and, in particular, to a complete electrical energy storage and recovery system via controlled storage and discharge of kinetic energy.

2. Description of the Prior Art

U.S. Pat. No. 5,614,777 issued on Mar. 25, 1997 to Jack G. Bitterly et al, discloses and claims a flywheel based energy storage system using an integral motor/generator, high speed flywheel, and magnetic bearings. The system disclosed in the '777 patent is costly since composite rotor materials are required, does not allow for minimum power, and an active thrust bearing is required to provide the necessary force to lift the rotor and maintain levitation for active axial position control. Further, the patented system does not allow for a large motor/generator to provide high power discharges for short durations due to the nature of the construction with the motor/generator located outboard of the bearings where increasing the size would cause significant operational rotordynamic problems. In essence, although the system disclosed in the '777 patent provides advantages over prior art designs, the system cost significantly reduces its commercial viability.

What is desired therefore is to provide a low cost system suited for high or low power discharges that uses a magnetic bearing which enables passive active lifting of the rotor mass in a vertical system for minimum bearing power, thereby maximizing system efficiency.

SUMMARY OF THE PRESENT INVENTION

The present invention provides an optimized flywheel energy storage system utilizing magnetic bearings, a high speed permanent magnet motor/generator, and a high strength flywheel system. The flywheel system is preferably constructed using a high strength steel wheel for kinetic energy storage, high efficiency magnetic bearings configured as a dual thrust and radial acting permanent magnet combination active magnetic bearings, and a high efficiency permanent magnet motor generator. The steel wheel provides a cost effective, high speed construction for the energy storage rotor in contradistinction to a composite material which, while enhancing the energy storage density in the system, increases system cost.

Two permanent magnet combination magnetic bearings are used, the first combination magnetic bearing being configured as a conventional, fully active three axis magnetic bearing with a permanent magnet bias as set forth in copending application Ser. No. 10/078,572, filed Feb. 20, 2002, now U.S. Pat. No. 6,727,617 and issued Apr. 27, 2004 and assigned to the assignee of the present invention. This homopolar configuration minimizes rotor losses due to magnetic field variations to keep rotor heating minimized. This heat minimization is critical for the flywheel, since with no physical contact between rotor and stator, radiating heat from the rotor to stator is the only way to provide for rotor cooling. The homopolar combination bearing provides active radial position control for two radial axes on one end of the shaft (X1, Y1) and also provides active axial load to pickup and maintain the axial position of the rotor. Configured in a vertical orientation to gravity, this configuration minimizes radial loads and input power requirements.

The second combination bearing is configured with two active radial axes and one passive axial axis. It is similar to the fully active combination bearing, with the one difference being the elimination of the active axial control coil and one of the thrust poles. The permanent magnet bias path, instead of splitting between the two opposing axial poles, is directed into the one remaining thrust pole, thereby providing a passive force in one direction. This force is configured and sized to provide a force nearly equal to the static weight of the rotor itself. This allows, once lifted by the fully active axial combination bearing, for the net power into the active axial axis of the other bearing to be near zero power. The radial axes of this modified combination bearing acts the same way as the three active axis bearing, controlling two radial axes (X2, Y2). In the vertical mode, the preferred arrangement of this system, and levitated in the magnetic bearings, the net power required for the bearings to provide the static lifting and position force is near zero power. All radial axes have no static load, as it is in the axial axis of the modified combination bearing, with the active axial axis of the other combination bearing not required to provide power to hold the shaft centered. While theoretically zero static power can be achieved, minimum levels of power will be present to account for off center operation due to mechanical tolerances and system tilt in installation.

Magnetic bearings are critical for long term, low maintenance operation in that they offer minimum rotor losses, have long life and do not require lubrication. The size of these bearings depends on the weight of the rotor for the axial axis, and the allowable system tilt during installation for the radial axes. While ball bearings combined with an active axial magnetic bearing minimizes axial load on the ball bearings, even mounting tilts of 1–2 degrees can cut operating life in half by adding load to the bearings. Magnetic bearings are not limited in life due to load. They can operate within a maximum load range with no affect on life, giving them a significant advantage in ground installations when ground shifting could cause system tilt to be in the range between 5–10 degrees, thereby increasing lifetimes of the ground installation. This system can use ball bearings for radial support for low life systems that necessitate minimum upfront cost.

The PM motor/generator also is an important component for this type of system. The motor/generator is located between the two bearings (not in an overhung manner) thus providing a robust rotor dynamic system and allows for ease of scaling to a larger power system. With rotor losses being critical for a successful system, these must be minimum for the motor/generator. The permanent magnet configuration in either the two or more pole rotors, depending on operating speed, is well suited for high speed operation and minimum rotor losses, as well as high efficiency. High efficiency is critical in the standby mode of such an energy storage device to hold power over a long duration. Power electronics interface with the motor/generator for adding energy to the flywheel and for providing an output to discharge energy from the flywheel. The electronics monitor the power bus and flywheel speed and switch between input and output accordingly. They can be configured for either a DC or AC bus for most applications including battery replacement.

The forces provided by permanent magnets require no power source, reducing connectors and current drivers while increasing reliability. In addition, utilizing a steel flywheel minimizes cost while still achieving high power density in the wheel. Although the power density is less than that provided by a composite material, it is well balanced to meet commercial performance requirements at acceptable costs, characteristics which cannot be met by systems using composite technologies.

A steel flywheel section provides the necessary mass for effective energy storage. High strength steel (such as ANSI 4340) is used to allow for high operating hub surface speeds. These high surface speeds reduce the mass of the wheel required, and with the low loss magnetic bearings and motor generator, high speeds are readily achievable for a very compact energy storage system. The complete rotating group is mechanically coupled via the hub, motor/generator rotor and bearing support system for a high stiffness rotor construction. The stationary bearings and motor/generator assemblies are mechanically linked and aligned via a housing and bolted together. The housing utilizes seals to effectively hold a vacuum to eliminate windage losses on the rotating members and sealed electrical connectors allow for bearing sensor signals and input power to the flywheel. A separate set of sealed connectors are used for motor/generator input and output power for electrical energy storage and discharge for the system. Connectors can be minimized by integrating bearing electronics into the flywheel housing, thus only requiring input power and outputting data signals.

This basic configuration is applicable to systems requiring high power output for short duty to systems requiring low power for long durations. This can be done as simply as varying the size/rating of the motor generator to as involved as changes to the flywheel hub for more or less energy capacity, which may require bearing size changes. This is limited by the system dynamics, and the overall configuration can change in speed and size to optimize these parameters for the lowest cost system.

DESCRIPTION OF THE DRAWING

For a better understanding of the present invention as well as other objects and further features thereof reference is made to the following description which is to be read in conjunction with the accompanying drawing wherein.

DESCRIPTION OF THE INVENTION

Figure 1:
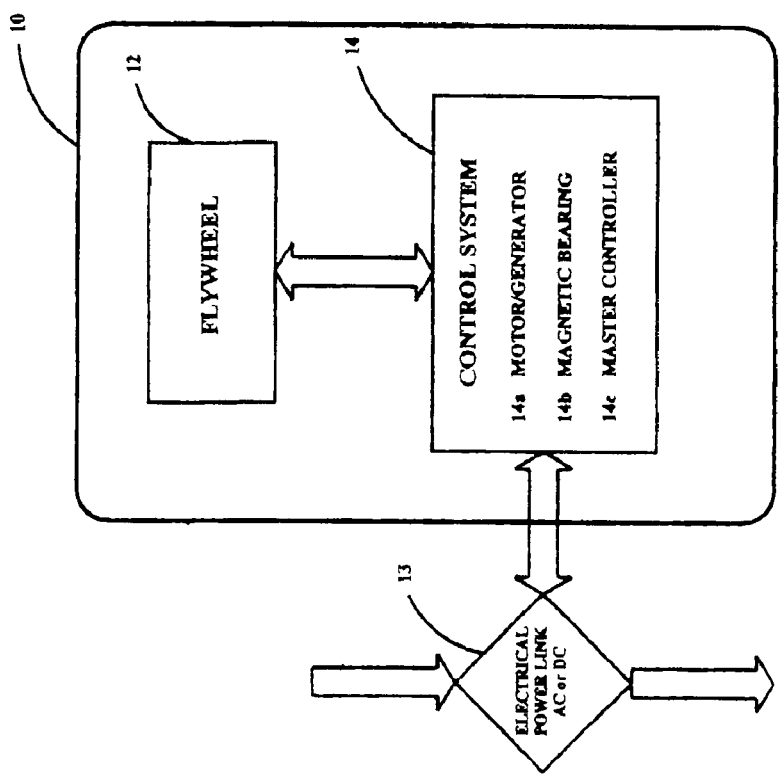
FIG. 1 is a block diagram of the flywheel system of the present invention.

FIG. 1 is a block diagram of the system 10 of the present invention. The flywheel module 12 is connected to a control system 14 that contains the motor/generator power electronics 14a, the magnetic bearing controller 14b, and the master controller 14c. These components function to allow for inputting electrical energy from an electrical power link 13 to the flywheel module 12, or outputting power from the flywheel module 12 to the electric power link 13. The flywheel 12 converts input power from electrical energy to mechanical potential energy. Upon output, the flywheel 12 converts the mechanical energy to electrical energy and supplies the control system 14. The motor/generator power electronics 14a conditions the input and output power to match the electrical power link 13, converting ac to dc and vice versa to match the flywheel voltage to the electrical power link 13 voltage. The magnetic bearing controller 14b monitors the shaft position and makes adjustments using the magnetic bearings to maintain the motor/generator shaft in the desired centered position during operation. The master controller 14c monitors the operation of the power electronics 14a and the magnetic bearing controller 14b monitors the operation of the electrical power link 13 to command charging or discharging of the flywheel 12, and interfaces with external systems to report operation of the flywheel 12 and receive commands.

Figure 2:
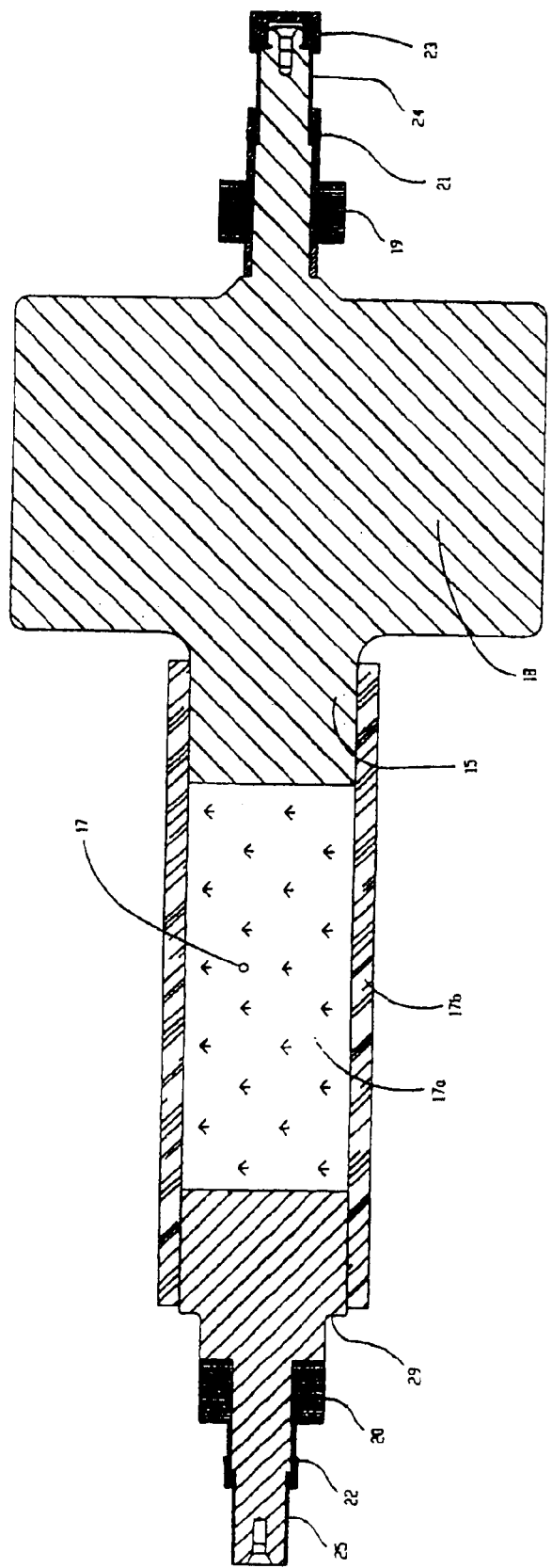
FIG. 2 is a partial, sectional perspective view of the flywheel system rotor.
Figure 3:
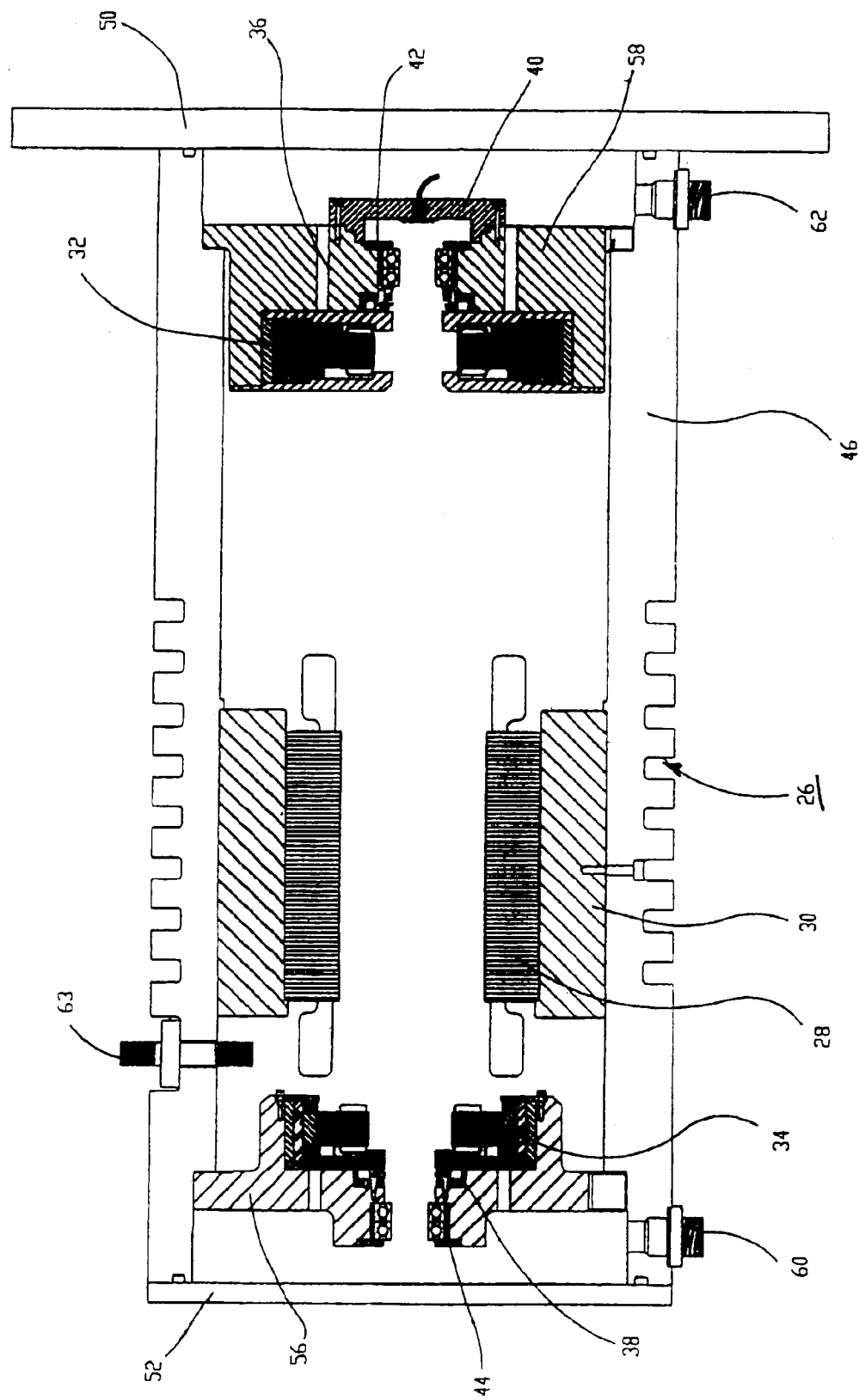
FIG. 3 is a sectional view of the flywheel system stator.
Figure 4:
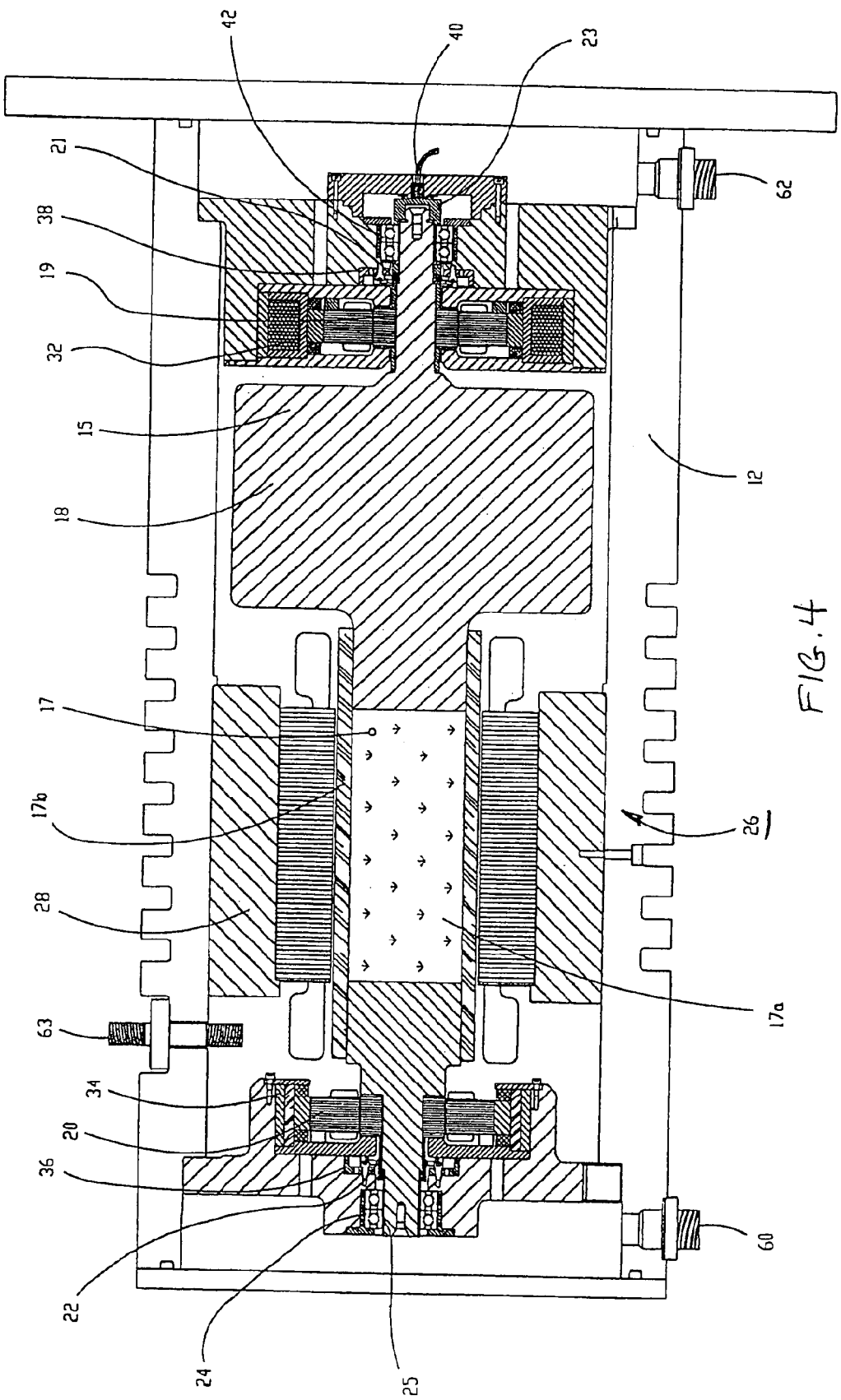
FIG. 4 is a sectional view of the assembled flywheel system embodying the magnetic bearing of the present invention.

Referring to FIGS. 2–4, flywheel module 12 comprises a rotating member 15 and a stationary member 26. The rotating member 15 comprises motor/generator rotor 17, flywheel hub section 18, a three axis active combination magnetic bearing target 19, a two active, one passive axis combination bearing target 20, radial position sensor targets 21 and 22, axial position sensor target 23, and touchdown ball bearing target sleeves 24 and 25. The flywheel hub 18 forms the energy storage portion of the system, requiring energy to increase its rotational speed, and providing the necessary energy to drive the generator when output is required. The motor/generator rotor 17 is comprised of a permanent magnet 17a and a high strength retaining ring 17b. Rotor 17 serves as the target of the motor/generator stator 28 (FIG. 3). The flywheel hub section 18 and the radial bearing end stub shaft 29 are faced up against the permanent magnet 17a, and the retaining ring 17b fits over all three components to form a rigid connection in the present embodiment. An alternate motor/generator construction would use a metal hub that would be part of or rigidly attached to the rotor hub 18 on which the permanent magnets are mounted. A high strength sleeve, preferably graphite, is then used to contain the magnets during rotation. Another embodiment utilizes a motor/generator rotor assembly that contains permanent magnet 17a and retaining ring 17b as part of a separate subassembly that is attached to the flywheel hub 18.

Magnetic bearing rotor targets 19 and 20 are interference fit onto the rotor sections 18 and 29, respectively, to provide a mechanism link between components. This is also the case for the bearing sensor targets 21 and 22 to their respective rotor hubs 18 and 29. Following assembly, these target surfaces are ground in relation to the center of the rotor 15 to allow the bearings to run true to the center of the remaining rotor assembly. The rotor is balanced following this grinding step to minimize unbalance loads.

The high speed spinning rotor is designed to operate to achieve maximum energy density for minimum size. The permanent magnet motor/generator configuration, in accordance with the teachings of the present invention, provides a high speed and high efficiency system with minimum rotor losses. The non-contact magnetic bearings maximize system efficiency by minimizing operating losses. These are critical for maximum system efficiency and minimal rotor heating. Since the system is operated in a vacuum, radiated heat transfer from the rotor to stator is the only method of rotor heat dissipation. As such, minimum rotor losses prevent excessive rotor heating and keep operating temperature at a minimum.

FIG. 3 illustrates the flywheel stationary member, or stator assembly, 26. The stator 26 is comprised of motor/generator stator assembly 28, motor/generator interface housing 30 (optional if the stator 28 is large enough to interface directly with the housing 46), a three axis active combination magnetic bearing stator 32 (this bearing arrangement is described in FIGS. 1 and 2 of copending application Ser. No. 10/078,572, filed Feb. 20, 2002, now U.S. Pat. No. 6,727, 617, the teachings of which necessary to the present invention being incorporated herein by reference), a two active, one passive axis combination bearing stator 34, radial position sensor assemblies 36 and 38, axial position sensor assembly 40, and touchdown ball bearing assemblies 42 and 44. These components are contained within housing 46 that provides a structural link between motor/generator 14a and the bearing system. Housing 46 also provides a mechanical link to ground when mounted to baseplate 50. Housing 46, with baseplate 50 and cover 52, seals the system from air to allow it to operate in a vacuum to minimize windage losses, thereby increasing system efficiency. The magnetic bearing stators, 32 and 34, the radial sensor assemblies, 36 and 38, and the touchdown bearings 42 and 44, are mounted and supported in housings 56 and 58, which are rigidly mounted in the housing 46.

Sealed connectors 60 and 62 provide the wiring interface for the magnetic bearings 32 and 34, the active control coils and sensor assemblies 36, 38 and 40. Utilization of sensorless motor/generator control electronics 14a eliminates the need for motor sensors, relying on the motor/generator itself for position information. Motor power is input or output to the stator via scaled power connector 63.

FIG. 4 illustrates the flywheel system 10 with rotor 15 assembled within stator assembly 26. The magnetic bearings 32 and 34 provide radial and axial support of the rotating rotor 15 with no physical contact and minimum rotor induced losses. The magnetic bearing controller 14b senses rotor position using sensors 36, 38 and 40, and commands currents to the magnetic bearings 32 and 34 that are converted to forces acting on the rotor targets 19 and 20. These forces are commanded to maintain the rotor shaft in the desired position while it is operating, not contacting any portion of the stator 26. The sensors 36, 38 and 40 are non-contact sensors that maintain larger clearance to their rotating targets 21, 22 and 23 than the clearance from rotor 15 to backup bearings 42 and 44. This is also true of bearings 32 and 34 and their respective targets 19 and 20. This feature insures that during a failure or overload condition the rotating rotor 15 only contacts the backup bearings 42 and 44 and no other stator part, thereby eliminating any possible damage to the system.

Figure 5:
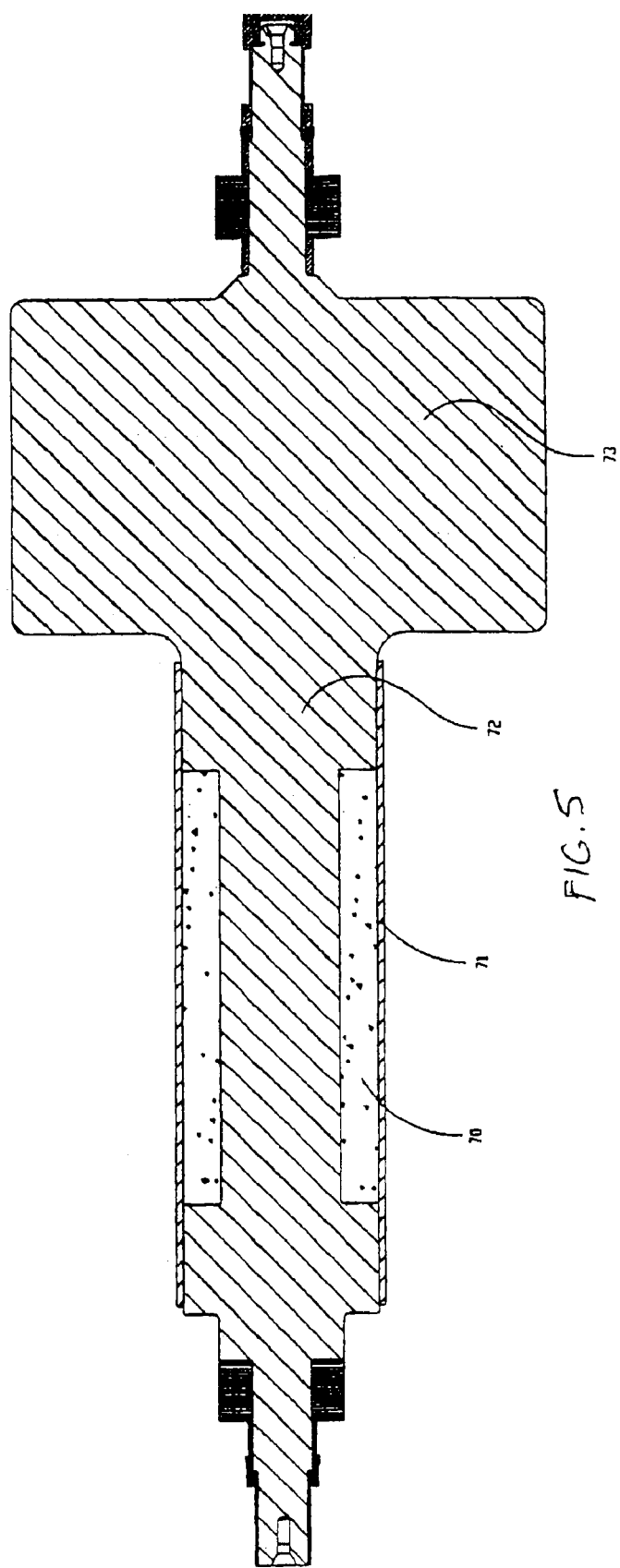
FIG. 5 illustrates a second embodiment of the flywheel system rotor design.
Figure 6:
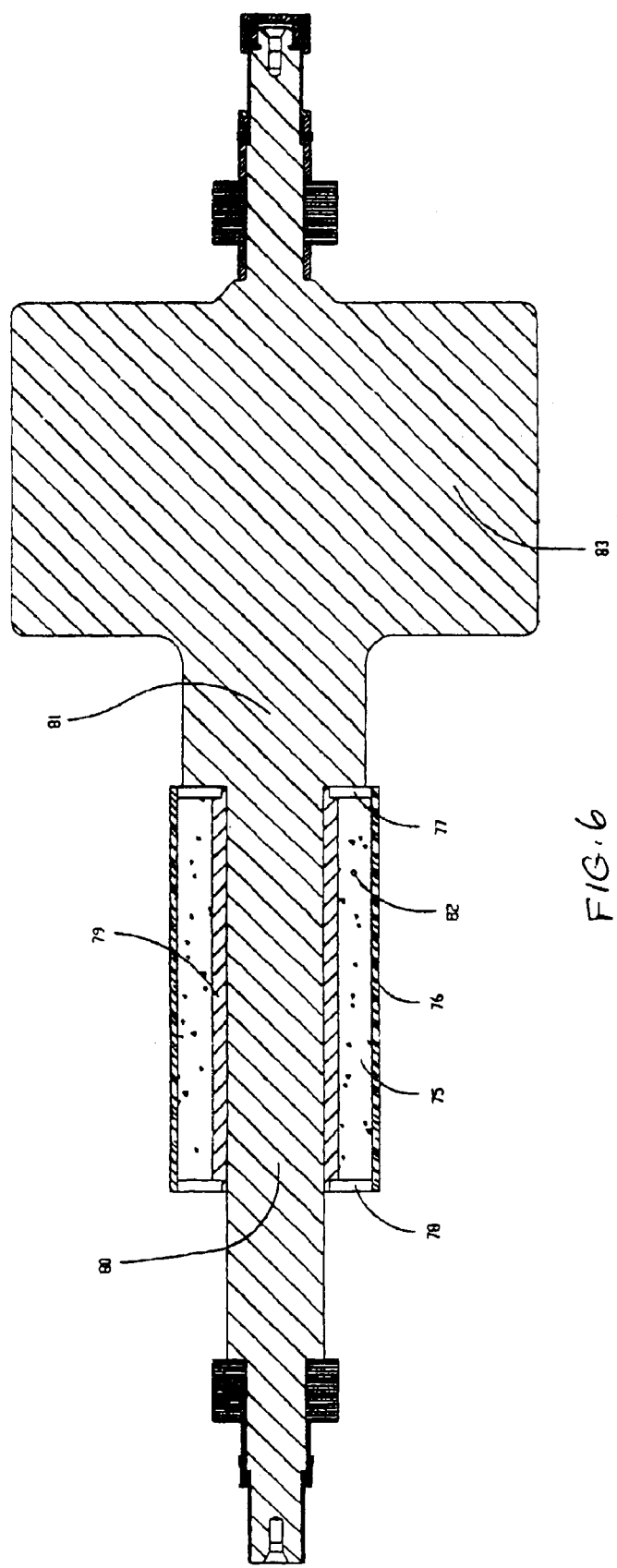
FIG. 6 illustrates a third embodiment of the flywheel system rotor design.

The passive combination bearing, comprised of components 20 and 34 and located at the top of the flywheel 12 provides active radial control of the shaft position and a constant force axially upward on the rotor 15. This bearing is shown in FIGS. 5 and 6 of copending application Ser. No. 10/078,572, now U.S. Pat. No. 6,727,617, the teachings of which is necessary for an understanding of the present invention being incorporated herein by reference. In order to clarify the operation of the magnetic bearings 32 and 34, a portion of the description of the device described in the '572 application is also set forth herein. In particular and referring to FIGS. 1 and 2 of the '572 application (corresponding to magnetic bearing 32) a target assembly 1 is attached to the shaft 14 and is acted upon by a radial set of poles 16 and a single axial ferrous pole 18. Four coils 26 provide the radial control flux. Each two opposing radial coils act together to result in a net force applied in the radial direction to the target assembly. Two axially magnetized permanent magnet members, 28 and 30, provide the bias flux for all axial and radial axes that utilize the core axial permanent magnet segments 28 and 30. This version is useful with systems wherein axial loads are substantially constant, and provides active radial position control and passive, one directional axial force without an axial control coil. Referring to FIG. 6 of copending application Ser. No. 10/078,572, now U.S. Pat. No. 6.727,617, and corresponding to bearing 34, the permanent magnet bias path 120 would pass from the axial stator pole 20, through the air gap 121 to the rotor target 1, through the radial air gap 122 to the radial stator pole 16 and back to the magnets 28 and 30. With the one axial stator pole 20 providing the permanent magnet bias field 120, a high axial force on the rotor disk 1 is produced. This force would be constant in one direction and could not be increased or decreased. A two axis controller is required to control the radial axes. This unique arrangement allows, with the correct design, for the weight of the rotor 15 to be supported by the passive upper bearing 34. The lower active bearing 32 would provide stability for the rotor in the axial direction, adjust force for any dynamic or shaking forces that may be present in the axial direction, and account for any offset or difference in force between the weight of the rotor 15 verses the passive force of the upper axial bearing 34 (upper bearing 34 is the active, radial passive axial combination configuration; lower bearing 32 is the active radial, active axial combination. The term "lower" defines the bearing (32) closest to the large flywheel hub, the term "upper" defines the bearing (34) closest to the motor/generator). The radial axes of bearings 32 and 34 account for any tilting forces due to the system 10 being mounted off-axis with gravity, provide radial stability in levitation of the rotor 15, and account for any dynamic or shaking forces that may be present in the radial directions. The radial bearing system, in order to minimize power required, would allow the rotor 15 to rotate about its mass center, which is functionally programmed into the magnetic bearing controller 14b.

This system can be used for high power, quick discharge systems, like that embodied in flywheel module 12, using a high powered motor/generator 17 and 28 and scaled to low power, long discharge systems. For example, the same system 10 with a smaller motor/generator 17 and 28 can output $1/10^{th}$ the power for 10 times longer, making it suitable for different applications. The flywheel hub section 18 can increase in axially length for added energy storage capacity, allowing for either longer output duration with the existing motor/generator 17 and 28, or with a larger motor/generator for higher power output for the same duration. The present invention thus offers a truly scalable flywheel system for energy storage level and discharge rate, making it suitable for a broad range of applications. Its construction using a steel flywheel hub section 18, common bearing components for each magnetic bearing 32 and 34, and relatively simple motor/generator 17 and 28 construction allows the system, and its many variations in power and energy to be very cost effective in production. The bearings 32 and 34 for these systems would remain configured the same but with larger axial load capacity for the added weight of the flywheel hub section 18. A smaller radial/thrust bearing system can also be used in conjunction with lifting permanent magnets acting on the flywheel hub section 18 for a passive lifting force. These passive lifting force permanent magnets would be in the form of a uniform rings mounted on a stationary housing and use the hub as the magnetic flux path.

Variations in the motor generator to capitalize on the low power losses include adapting alternate rotor approaches for application or size changes. An integrated two or more magnet pole rotor can be seen in FIG. 5. The rotor 73 is constructed of one piece of material, either from the same piece of material or with multiple pieces integrated to form essentially one piece. Magnets 70 are installed on the shaft 72 and a graphite or containment sleeve 71 is installed to contain the magnets. The rotor structural strength is provided by the shaft 72 and its uniform construction.

Another alternate construction of the motor generator for use in system 10 is shown in FIG. 6. This rotor assembly 83 uses a motor generator rotor 82 comprised of permanent magnet 75, steel hub 79, end plates 77 and 78, and containment sleeve 76. The two or more magnet pole rotor 82 can be assembled as a unit and then installed onto the uniform shaft 81 for added simplicity in assembly.

The present invention thus provides two lifting bearings that minimize total bearing power while maximizing system efficiency.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An energy storage flywheel system comprising:
   a rotating member;
   a stationary member;
   a magnetic bearing system for supporting said rotating member with respect to said stationary member;
   a flywheel hub section forming the energy storage portion of said system;
   a permanent magnet motor/generator with a permanent magnet integral with said rotating member and held in place by a high strength retaining ring thus forming a rigid connection between said flywheel hub section and a radial bearing end stub shaft adjacent thereto;
   a housing providing a structural link between said motor/generator and said bearing system;
   first and second members cooperating with said housing to provide a vacuum seal for said system; and
   a magnetic bearing controller for sensing rotor position and commanding currents to said magnetic bearing system to control the position of said rotating member.

2. The system of claim 1, further including backup bearings located adjacent said magnetic bearing system, said backup bearings being available for use during system failure or a system overload condition.

3. The system of claim 1, wherein said flywheel hub section is comprised of metal.

4. The flywheel of claim 3 wherein said flywheel hub section metal comprises steel.

5. The system of claim 1 further comprising a two active, one passive magnetic bearing axis support.

6. The system of claim 5 wherein said system further comprises an additional three active magnetic bearing axis support.

7. The system of claim 1 wherein said magnetic bearing system comprises first and second magnetic bearings, said flywheel hub section and motor/generator being positioned between said first magnetic bearing and said second magnetic bearing.

8. An energy storage flywheel system comprising:
   a stationary member;
   a rotating member;
   a magnetic bearing system for supporting said rotating member with respect to said stationary member;
   a flywheel hub section forming the energy storage portion of the system;
   a permanent magnet motor/generator with a permanent magnet integral with said rotating member having a metal hub rigidly attached to said flywheel hub section on which permanent magnets are attached;
   a sleeve for containing said permanent magnets;
   a housing providing a structural link between motor/generator and said bearing system, first and second members cooperating with said housing to provide a vacuum seal for said system; and
   a magnetic bearing controller sensing rotor position commanding currents to said magnetic bearing system to control the position of said rotating member.

9. The system of claim 8 further including backup bearings located adjacent said magnetic bearing system, said back up bearings being available for use during system failure or a system overload condition.

10. The system of claim 8 wherein said flywheel hub section is comprised of metal.

11. The system of claim 10 wherein said metal comprises steel.

12. The system of claim 9 wherein said system comprises a two active, one passive magnetic bearing axis support.

13. The system of claim 12 further comprising an additional three active magnetic bearing axis support.

14. The system of claim 8 wherein said sleeve comprises high strength graphite.

15. The system of claim 8 wherein said magnetic bearing system comprises first and second magnetic bearings, said flywheel hub section and motor/generator being positioned between said first magnetic bearing and said second magnetic bearing.

* * * * *